(12) United States Patent  (10) Patent No.: US 8,056,555 B2
Prueitt  (45) Date of Patent: Nov. 15, 2011

(54) THIN FILM TROUGH SOLAR COLLECTOR

(76) Inventor: Melvin L. Prueitt, Los Alamos, NM (US)

( * ) Notice: Subject to any disclaimer, the term of this patent is extended or adjusted under 35 U.S.C. 154(b) by 1014 days.

(21) Appl. No.: 11/696,854

(22) Filed: Apr. 5, 2007

(65) Prior Publication Data
US 2007/0240704 A1  Oct. 18, 2007

Related U.S. Application Data

(60) Provisional application No. 60/744,675, filed on Apr. 12, 2006.

(51) Int. Cl.
F24J 2/12 (2006.01)
F24J 2/10 (2006.01)

(52) U.S. Cl. ........ 126/696; 126/694; 126/692; 126/684; 126/600; 126/569; 136/246

(58) Field of Classification Search .................. 126/600, 126/684, 692, 694, 696, 704, 709; 136/246
See application file for complete search history.

(56) References Cited

U.S. PATENT DOCUMENTS

| 1,111,239 | A | * | 9/1914 | Smelser | 359/853 |
| 1,162,505 | A | * | 11/1915 | Nichols | 126/604 |
| 3,923,381 | A | | 12/1975 | Wiinston | |
| 4,000,734 | A | * | 1/1977 | Matlock et al. | 126/576 |
| 4,011,858 | A | * | 3/1977 | Hurkett | 126/605 |
| 4,038,971 | A | * | 8/1977 | Bezborodko | 126/606 |
| 4,078,549 | A | * | 3/1978 | McKeen et al. | 126/606 |
| 4,106,480 | A | * | 8/1978 | Lyon et al. | 126/606 |
| 4,108,154 | A | * | 8/1978 | Nelson | 126/576 |
| 4,114,594 | A | * | 9/1978 | Meyer | 126/606 |
| 4,114,694 | A | | 9/1978 | Dinning | |
| 4,136,671 | A | * | 1/1979 | Whiteford | 126/654 |
| 4,149,523 | A | * | 4/1979 | Boy-Marcotte et al. | 126/589 |
| 4,184,482 | A | * | 1/1980 | Cohen | 126/606 |
| 4,205,659 | A | * | 6/1980 | Beam | 126/578 |
| 4,240,406 | A | * | 12/1980 | Hutchison | 359/867 |
| 4,245,616 | A | * | 1/1981 | Wyland | 126/579 |
| 4,273,104 | A | * | 6/1981 | Uroshevich | 126/652 |
| 4,413,618 | A | * | 11/1983 | Pitts et al. | 126/684 |

(Continued)

FOREIGN PATENT DOCUMENTS
EP  373234 A1 *  6/1990

Primary Examiner — Steven B McAllister
Assistant Examiner — Desmond Peyton

(57) ABSTRACT

This invention is a trough solar collector that uses inexpensive aluminized plastic films as the reflecting surface. The films are held in proper shape by stretching them between rigid ribs that are spaced apart along the length of the collector. The structure of the trough is held rigid by a unique sun-tracking system that not only guides a whole of array of troughs on a field to point them toward the sun, but also maintains the whole length of each trough in rigid configuration. It is not necessary to extend rigid metal beams along the trough to maintain the rigidity of the trough. Small-diameter cables are wrapped around rotatable pipes that extend along the east and west sides of the field. The cables extend over the field of the troughs and are attached to connecting points above the troughs in such a way that when the rotatable pipes rotate, the cables move, the troughs move with them, and the cables provide the rigidity of the troughs. The troughs are supported by support posts that are driven into the ground. Since the support posts do not have to supply torque to rotate the troughs, no concrete foundations are necessary.

13 Claims, 5 Drawing Sheets

U.S. PATENT DOCUMENTS

| | | | |
|---|---|---|---|
| 4,432,343 A * | 2/1984 | Riise et al. | 126/602 |
| 4,466,423 A * | 8/1984 | Dolan et al. | 126/571 |
| 4,469,938 A * | 9/1984 | Cohen | 250/203.4 |
| 4,515,148 A * | 5/1985 | Boy-Marcotte et al. | 126/570 |
| 4,546,757 A * | 10/1985 | Jakahi | 126/604 |
| 4,559,926 A * | 12/1985 | Butler | 126/578 |
| 4,611,575 A * | 9/1986 | Powell | 126/605 |
| 4,968,355 A * | 11/1990 | Johnson | 136/246 |
| 5,058,565 A * | 10/1991 | Gee et al. | 126/570 |
| 5,071,243 A * | 12/1991 | Bronstein | 359/867 |
| 5,191,876 A * | 3/1993 | Atchley | 126/576 |
| 6,075,200 A * | 6/2000 | O'Neill | 136/246 |
| 6,676,263 B2 | 1/2004 | Winston | |
| 6,832,608 B2 * | 12/2004 | Barkai et al. | 126/653 |
| 2002/0179138 A1* | 12/2002 | Lawheed | 136/246 |
| 2005/0225885 A1* | 10/2005 | Wright | 359/871 |
| 2006/0150967 A1* | 7/2006 | Hoelle et al. | 126/694 |
| 2010/0258186 A1* | 10/2010 | Harrenstien et al. | 136/259 |

* cited by examiner

THIN FILM TROUGH SOLAR COLLECTOR

CROSS-REFERENCE TO RELATED APPLICATION

This claims priority to and the benefit of Provisional U.S. Patent Application Ser. No. 60/744,675, filed Apr. 12, 2006, the entirety of which is hereby incorporated herein by reference.

BACKGROUND OF THE INVENTION

Regular parabolic trough solar collectors are typically built with rugged structural members to provide rigidity so that when one part of the trough is rotated by a sun-tracking mechanism, the whole trough rotates together. The parabolic reflectors are typically glass or highly polished metal. U.S. Pat. Nos. 4,114,694 and 5,058,565 show trough structures that can be rotated by external means, but the troughs have to be rotationally rigid.

The rigid structures of these troughs are expensive, and the reflecting surfaces are expensive.

The tubes that carry the cooling fluid are typically located somewhat above the parabolic reflector. These designs are typically quite sensitive to the accuracy of the sun-tracking system. That is, if the troughs are not pointed fairly accurately toward the sun, the reflected rays tend to miss the target (the pipe carrying the cooling fluid). U.S. patents such as U.S. Pat. Nos. 3,923,381 and 6,676,263 overcome this problem by having a fairly narrow channel for concentrating the sunrays, and the fluid pipe is located deep within the cavity. These troughs also require rigid and expensive structures to maintain the geometry of the troughs.

SUMMARY OF THE INVENTION

This invention, called "Suntrof" herein, is a design for a solar trough collector which has the target fluid pipe deep within the cavity formed by a parabolic reflector. The reflector is an aluminized plastic film or other flexible reflective material, which is held in place by being stretched horizontally (longitudinally) between rigid ribs and cemented to the inside of the ribs. A protective sheet of tough plastic film is cemented to the outside of the ribs to prevent wind from hitting the reflective film. The ribs can be metal or fiber-reinforced plastic and can be molded in a factory inexpensively.

Since many of the aluminized plastic films have high tensile strength, if a sheet of the film is stretched tightly between two curved ribs, the film between the ribs will have a strong tendency to maintain the same curvature as the ribs over the whole length of the film. The tension of the sheet is transmitted from rib to rib until the sheet reaches the end of the trough, where the force of the tension is countered by a rigid end framework. By this means, the ribs do not have to sustain any large lateral or longitudinal forces.

One of the main features of the Suntrof structure is the concept that rigidity of the trough is provided mainly by the sun-tracking system. By having a set of sun-tracking cables connected to the tops of a set of troughs on a field, rigidity is provided, and all parts of each trough are pointed toward the sun. The cables are attached to tracking pipes at the east and west sides of the field, which rotate to cause the cables to move east and west and thus move the troughs east and west to track the sun. In this sense, it is similar to the tracking method presented in the U.S. patent application No. 60/648,865, "Solar Power Concentrator Using Reflective Films" by the present inventor. That system goes by the acronym of "Suncone." The tracking system of Suncone is similar to the one presented here, except that Suncone has a two-axis tracking, while Suntrof has single axis tracking. But the major difference is that the Suntrof tracking system is designed to provide rigidity to the troughs, whereas the tracking system of Suncone does not provide rigidity to the reflective surface geometries.

Since the troughs are held in place by leverage of the cables from above, concrete foundations are not necessary, as they are with regular solar troughs and dishes. The Suntrof supports may simply be pipes driven into the ground.

The plastic film reflectors are much less expensive than glass or polished metal reflectors. Since strong metal beams are not required to provide the rigidity, additional expense is saved.

By having the fluid pipe down near the bottom of a fairly narrow trough, the system requires less tracking accuracy, and the cable tracking method will function properly.

It is therefore an object of the present invention to efficiently collect solar energy by a parabolic trough design that requires less sun-tracking accuracy than widely used parabolic troughs.

It is another object of the present invention to provide a method that utilizes inexpensive plastic films as parabolic reflectors in order to provide a less expensive method of collecting solar energy.

It is another object of the present invention to provide a sun-tracking system that not only causes a field of troughs to track the sun but also provides rigidity to the troughs without having to have heavy metal structures.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate embodiments of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
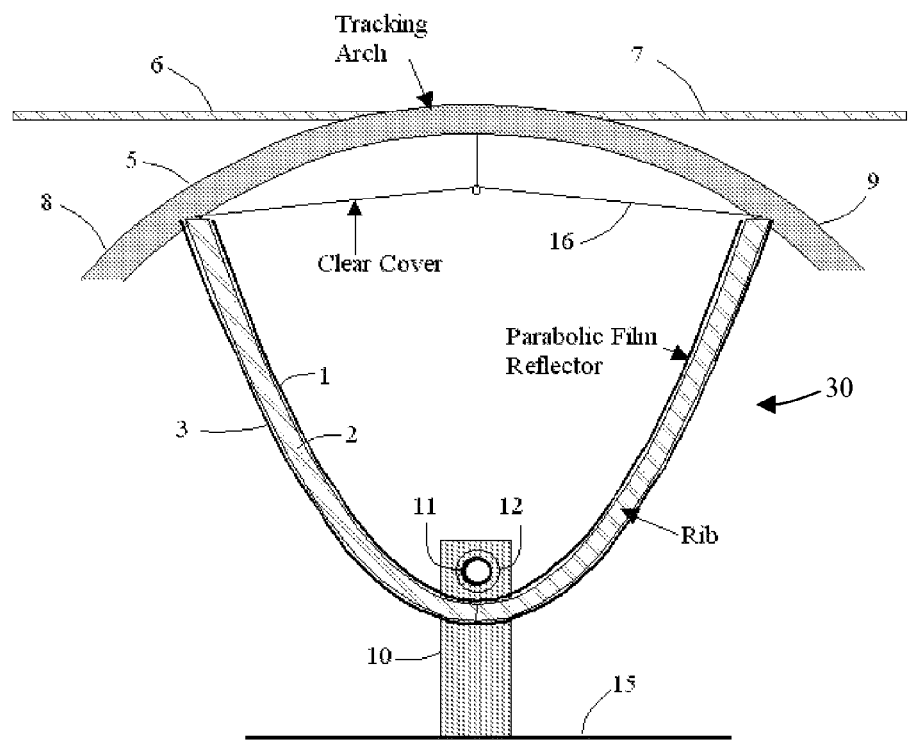
FIG. 1 is a cross-sectional end-view schematic of one embodiment of the present invention in which the ribs are shown supporting the reflective film and the outside protective film, and the trough is pointed toward the sun by cables connected to an arch above the trough.
Figure 2:
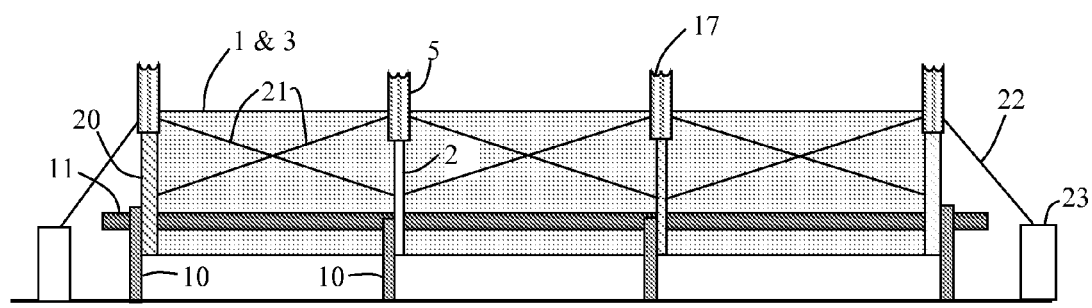
FIG. 2 is a side view of the trough showing the ribs with the tracking arches attached.

FIG. 1 is a schematic drawing of an end-view of the trough. FIG. 2 shows a side view of a short trough. Actually a trough may be quite long, and there may be many ribs distributed periodically along the trough.

An important feature of this invention is that the whole trough is held rigid by the tracking cable system. At first, one might think that a long trough system built with lightweight plastic components would tend to twist along its length. That is, parts of it would point in different directions. But the tracking cable system is attached to the tracking arch 5, and that provides it with a long lever arm that pivots about the fluid pipe 11. Even a small cable can hold the system rigid in windy conditions, due to the long lever arm. Archimedes said, "Give me a lever long enough and a fulcrum on which to place it, and I shall move the world." The ribs 2 and the tracking arches 5 form levers that rotate the trough from the top, rather than having the trough rotated from the bottom as with regular troughs and dishes.

In FIG. 1, trough 30 has the reflective film 1 that is supported by ribs 2. A protective enclosure 3, which can be a tough plastic film, is supported by cementing the film to the outside of the ribs. The tracking arch 5 is attached rigidly to the ribs. Cable 6 fits into a groove in the top of the arch and is connected at point 9 in the arch. Cable 7 fits into a second groove in the arch and is connected at point 8. With this design, as the cables move from side to side, the arch rolls and moves the trough with it.

The trough is supported by a support post 10. The support post also supports the fluid pipe 11 and the glass enclosure tube 12.

The trough is covered by a transparent cover 16 to prevent wind and dust from entering the trough. The cover is sealed to the protective enclosure film along the top sides.

FIG. 2 gives a schematic side view of the trough showing the relationship of the films 1 and 3, the ribs 2, the arches 5, the fluid pipe 11, and the support posts 10. It also shows diagonal guy wires 21 that help maintain the rigidity of the trough structure. The guy wires 22 provide support for the end frames 20. The guy wires 22 are attached to support structures 23 at a point that is in line with the center of rotation of the trough (the center of the fluid pipe 11).

The tracking arch 5 is a piece of rigid material that is a circular arc as though it were a portion of a rim of a wheel with its radius equal to the distance from the rim to the pivot line of the rotation of the collector. (The pivot line is the center of the fluid pipe). The tracking cables fit into grooves 17.

If the forces necessary to counter gravity and wind loads were provided by a pivot at the bottom of the trough (as it is with current dish and trough solar collectors) the structure would have to be very robust, and heavy gear boxes would be required to point the trough toward the sun.

Figure 3:
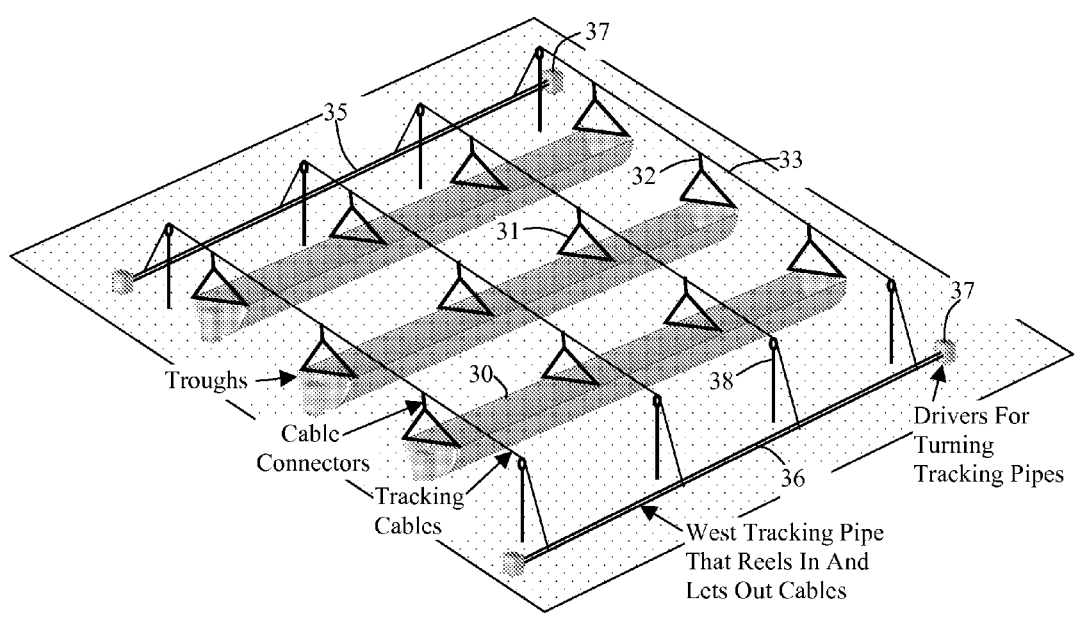
FIG. 3 is an isometric drawing that illustrates another embodiment of the present invention in which the operation of the tracking system uses a framework and a connecting rod to rotate all the troughs in a field toward the sun and provides rigidity to the troughs.

FIG. 3 illustrates another embodiment of the present invention. Rather than having arches for cable attachment, it has frame structures above the troughs that connect to the tracking cables. FIG. 3 is an isometric drawing showing the sun-tracking system consisting of cables 33, which are attached to connection rods 32 (cable connectors) that are held above the troughs 30 by frameworks 31. The cables 33 wrap around tracking pipes 35 and 36 on the east and west sides of the field, respectively. The tracking pipes are rotated by drivers 37. As the tracking pipes rotate, the cables, which are wrapped around the tracking pipes, are drawn in or let out. The tracking pipes act as reels. The cables form a single-layer wrap around the pipes. Poles 38 with pulleys on top provide support for the cables. Not shown are intermediate tracking pipe supports with bearings along the tracking pipes.

This method may be a little simpler than the arches, but it has the disadvantage that as the troughs point far to the east or west, the cables are pulled downward by their connections to connection rods 32. This would require that the tracking pipes on the east and west rotate at slightly different rates.

When the circular arches are used, the tracking pipes on the east and west would rotate at the same rate.

As the west tracking pipe rotates to pull on the cable and the east tracking pipe rotates to let the cable out, the troughs rotate to the west to follow the sun (in both the embodiments of FIGS. 1 and 3). If the cable connection point is six feet above the fluid pipe, the tracking pipe would need to draw in about 15 feet of cable (assuming the troughs go no lower than 20 degrees from the horizon). If quarter-inch cable is used and the tracking pipes are 4 inches in diameter, the cable would wrap around the pipe about 14 times, which means that the cable would occupy a distance of about 4 inches along the pipe when fully wound. We do not want the cable to be wrapped more than one layer in depth on the pipe. If it is wrapped more than one layer, the amount of draw during one revolution would be different on the second layer than on the first.

Figure 4:
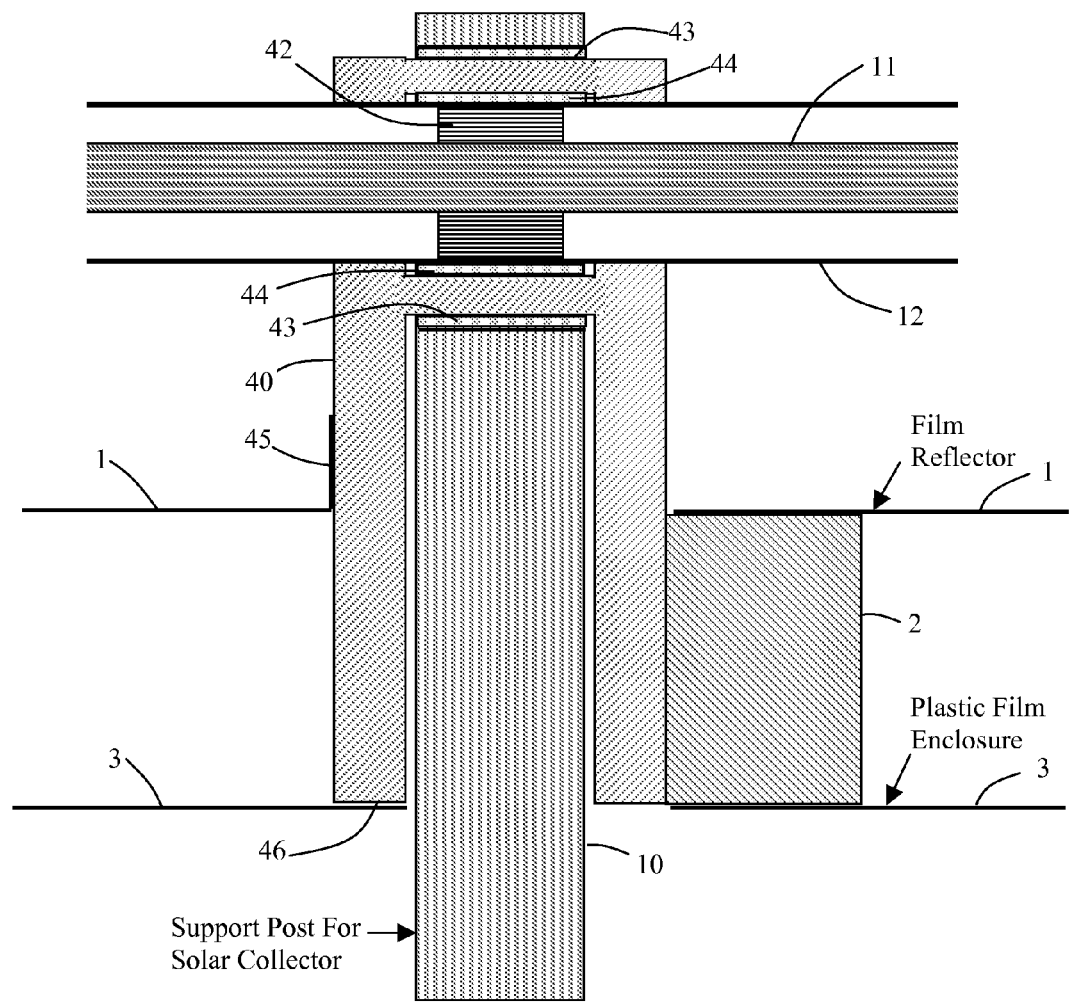
FIG. 4 is a schematic side view showing a method of having a support post hold up the fluid pipe and the trough components.

FIG. 4 is a side view schematic that shows a method of having the support posts 10 hold up the trough and the fluid pipe 11 and its glass enclosure tube 12. The support post holds up the connection assembly 40 by bearings 43, since the connection assembly must rotate. The rib 2 to which the plastic films 1 and 3 are attached is connected to the connection assembly 40. As the tracking system rotates the trough, the connection assembly rotates with the trough and the ribs. But the fluid pipe 11 and its glass enclosure tube 12 do not rotate. A hole from left to right through the top of the connection assembly provides a passage for the glass tube and the fluid pipe. Another bearing 44 allows the connection assembly to rotate as it supports the glass tube. A glass tube-pipe separator 42 between the pipe and glass tube provides support for the fluid pipe.

Note that the reflective film 1 and the enclosure film 3 approaching from the right are cemented to the rib. However, the support post must pass through the films in order to support the fluid pipe. That means that at the bottom, the films' continuity is interrupted by the penetration of the support post into the trough. The connection assembly affords a method of attaching the plastic films so that dust does not enter the trough. The reflective film 1 and the enclosure film 3 approaching from the left at the bottom are cemented to the connection assembly at points 45 and 46, respectively.

Figure 5:
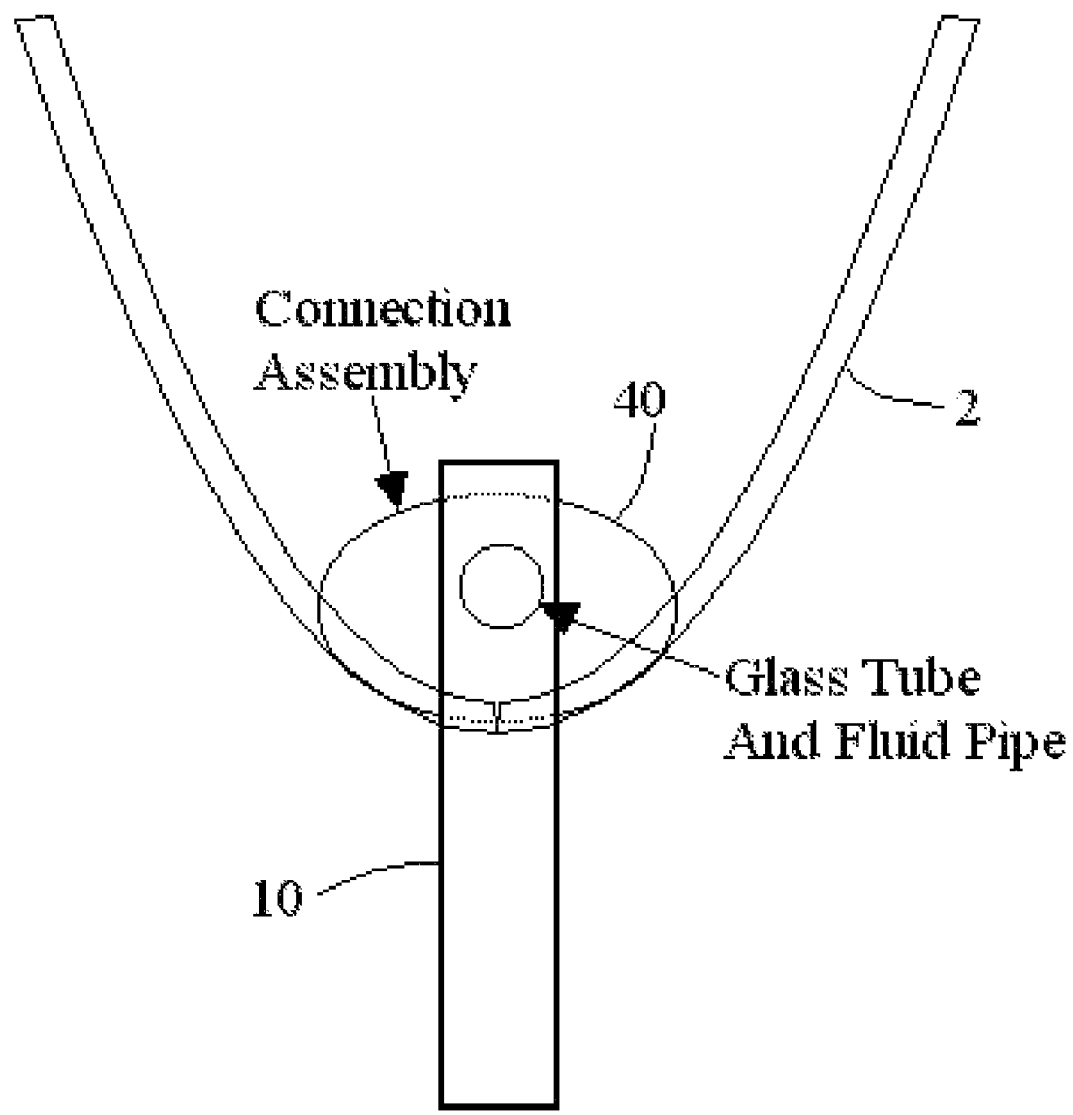
FIG. 5 is a schematic end view of the connection assembly construction of FIG. 4 showing its relationship to the support post and the rib. The bottom of the trough is open to allow the penetration of the support post, but the plastic films are cemented to the connection assembly in this area to prevent dust from entering the trough.

FIG. 5 shows an end view schematic of the relationship of the support post 10, the connection assembly 40, and the ribs 2.

Figure 6:
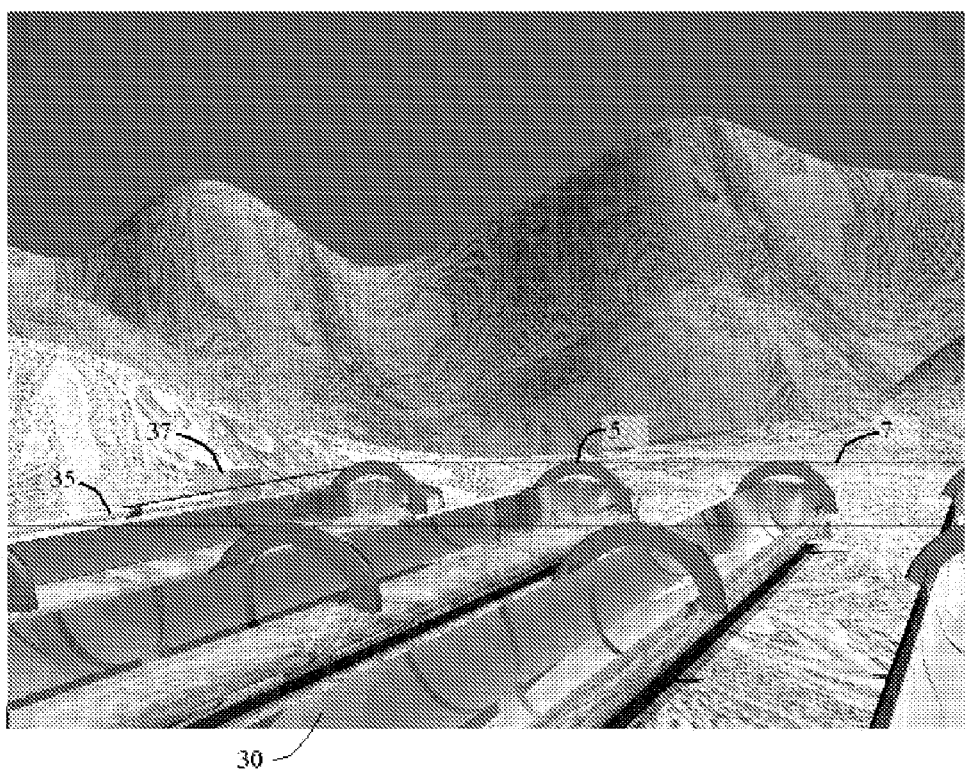
FIG. 6 is a perspective computer graphic image of a Suntrof array showing tracking cable connection to arches above the troughs.

FIG. 6 is a computer graphic image illustrating a field setup of some troughs of the embodiment shown in FIGS. 1 and 2. It has the arches 5 that connect the cables 7 to the troughs 30. The tracking pipe 35 and its driver 37 are shown in the distance.

Solar Collection Efficiency of Suntrof Compared to Other Solar Concentrators

Trough collectors have the disadvantage of losing efficiency during the winter due to the fact that the sun is low in the south (in the Northern Hemisphere), and the troughs do not rotate toward the south. On December 21 of each year in southern California, Arizona, and New Mexico, the sun is only about 34 degrees above the horizon at noon, which means that the solar collectors get only 56% as much solar energy as they would if the sunrays were perpendicular to the collectors' apertures. Solar parabolic dishes and Suncone collectors can rotate to the south to keep the sunrays perpendicular to the aperture.

The disadvantage of the dish collectors is that they have to be spaced apart in the north-south direction to prevent shadowing on each other in the winter. (All dish, trough, and Suncone collectors have to be spaced apart in the east-west direction). Consider a Suntrof collector that is 4 meters wide and 100 meters long. On December 21 at noon, it would be receiving 224 kilowatts of solar energy. A row of solar dishes lined up in a north-south row, each having a diameter of 4 meters, would need to have a north-south spacing of about 5.5 meters to reduce shadowing. Each dish would have an aperture of 12.57 square meters. If there were 19 dishes lined up along the 100-meter long field, the total amount of solar energy received would be 239 kW in mid winter, which is only about 7% more than the solar trough that covers the same amount of land. In the summer, the solar dish row would still receive 239 kW of solar energy, but the trough would receive 395 kW. So, for the same amount of land coverage, the troughs would receive much more solar energy. Of course, we must also consider how efficiently each collector transforms the energy into heat in the fluid that flows through it.

As a comparison between Suntrof and standard parabolic solar troughs, Table 1 gives computer ray-trace calculations of efficiency for both types of solar collectors.

TABLE 1

Efficiency comparison between Suntrof and regular parabolic trough solar collectors as a function of temperature and degrees off center (sun-tracking accuracy).

| Temperature (Degrees C.) | Degrees Off Center | Efficiency of Suntrof (%) | Efficiency of Solar Troughs (%) |
|---|---|---|---|
| 250 | 0 | 85.6 | 85.5 |
| 250 | 2 | 77.7 | 46.3 |
| 250 | 3 | 59.9 | 0.0 |
| 400 | 0 | 77.7 | 77.2 |
| 400 | 2 | 69.0 | 38.3 |
| 400 | 3 | 50.8 | 0.0 |
| 500 | 0 | 68.3 | 67.6 |
| 500 | 2 | 59.3 | 28.8 |
| 500 | 3 | 41.4 | 0.0 |
| 600 | 0 | 54.9 | 53.3 |
| 600 | 2 | 46.0 | 15.1 |
| 600 | 3 | 28.2 | 0.0 |
| 700 | 0 | 35.5 | 33.8 |
| 700 | 2 | 26.1 | 0.0 |
| 700 | 3 | 6.5 | 0.0 |

If the collector is pointed directly at the sun so that the sunlight is focused on the fluid pipe (containing the heat-collecting fluid), the "degrees off center" is zero. The degrees off center refers to the east-west tracking accuracy, not the north-south position of the sun. The efficiency represents the amount of heat delivered to the fluid compared to the sunlight that is incident on the reflector. In both cases, the collector aperture is two meters wide. However, the dimensions may be scaled up to any size with the same results in efficiency.

Note that the efficiency of both types of solar concentrators drops off as the degrees off center increases, but the efficiency of the regular solar trough drops off faster. In fact, when the regular solar collector is pointed three degrees off dead center of the sun it focuses zero energy onto the fluid pipe for all cases considered in the table.

At higher temperatures, the efficiency drops off, because there is greater radiation from the fluid pipe.

For high temperatures, dish or Suncone collectors have higher efficiency than troughs. Suntrof collectors have higher efficiency, are less expensive, and need less tracking accuracy than regular troughs.

Fabrication

The ribs are constructed with a parabolic shape for the inside surface. Two ribs are bolted together at the bottom to form the ribs on each side. The ribs can be assembled to the trough support system in the field, and then the tracking arches can be attached.

After the fluid pipe with its glass enclosing tube is emplaced and the ribs are connected, the unit is tilted down to one side, and a sheet of reflecting film is placed in the lowered ribs, stretched horizontally, and cemented to the ribs. If desirable, a strip of plastic material can be used to press the film against the rib, and the strip can be bolted in place by bolts that extend through the plastic film into the rib.

After that reflective film is in place, the unit is rotated the opposite direction, and a reflective sheet is placed in the other half, tightened, and cemented in place. The two sheets are sealed together at the bottom. Then the protective enclosing outer film is attached on the outside of the ribs as tension is applied. This protective film prevents the wind from affecting the reflective film.

The frame structure on the ends of the Suntrof modules must be robust enough to sustain the tension of the plastic sheets and the guy wires. End guy wires supply the force to counteract the plastic sheet tension. The lower end of the guy wires are attached to an anchor at a point that is in line with the pivot line (center of the fluid pipe).

What is claimed is:

1. A solar energy collection system comprising:
   a set of rigid ribs spaced apart along the length of the solar energy collection system, each of which rigid ribs has a parabolic curvature on an inner surface; and
   a set of connection assemblies to which the rigid ribs are connected; and
   a set of support posts anchored to the ground or other foundation, which support posts are rotatably connected to said connection assemblies to support the connection assemblies and the rigid ribs; and
   a reflective film supported on the inner surfaces of the rigid ribs, the film having a curvature approximating the curvature of the inner surfaces of the rigid ribs to thereby define a film trough having a parabolic cross section, for reflecting sun rays to a focal line; and
   a sun-tracking and rigidizing system connected to each of the rigid ribs for rotating the solar energy collection system toward the sun and for providing the solar energy collection system with rotational rigidity, each sun-tracking and rigidizing system comprising an arch having first and second ends connected to a top of the rigid rib and above the trough; and
   tracking cables attached to the sun-tracking and rigidizing system for imparting a force to the top of the sun-tracking and rigidizing system thereby to rotate the solar energy collection system; and a control system for retracting and letting out the tracking cables for pointing the solar energy collection system toward the sun; and a fluid pipe, at the focal line of the reflected sunlight from the reflective film, for carrying a flowing fluid to absorb the heat of the solar energy;

wherein the control system moves the tracking cables in unison to rotate the solar energy collection system toward the sun so that the sunlight striking the reflective film is reflected to the fluid pipe, which heats the flowing fluid within the fluid pipe; and wherein the rigid ribs are connected by a plurality of guy wires running longitudinally along the length of the solar energy collection system, the guy wires helping maintain rigidity of the trough.

2. A solar energy collection system according to claim 1, wherein each of the arches defines at least one groove on its surface for the placement of tracking cables, and wherein the tracking cables cause the rotation of the solar energy collection system as the tracking cables are moved, and wherein the tracking cables and the tracking and rigidizing system provide rigidity to the solar energy collection system when the tracking cables are moved in unison by the control system.

3. A solar energy collection system according to claim 1, wherein the center of rotation of the solar energy collection system is the center of the fluid pipe to eliminate the need to move or rotate the fluid pipe as the solar energy collection system rotates, the fluid pipe in fluid communication at its ends with input and output pipes.

4. A solar energy collection system according to claim 1, wherein the reflective film is stretched in the longitudinal direction so that the curvature of the film perpendicular to its length approximates the curvature of the inner surface of the rigid ribs, and wherein ends of the solar energy collection system comprise frameworks for supporting tension of the reflective films, and wherein end cables support the frameworks, which end cables are attached to support structures at a point that is in line with the center of the fluid pipe.

5. A solar energy collection system according to claim 1, wherein a protective enclosing film is disposed outside the rigid ribs to protect the reflective film.

6. A solar energy collection system according to claim 1, wherein a transparent tube encloses the fluid pipe to prevent loss of heat.

7. A solar energy collection system according to claim 1, wherein a transparent cover is placed across the top of the trough and sealed at the sides to provide protection for the reflective film.

8. A solar energy collection system according to claim 1, wherein the reflective film is a sheet that comprises one or more layers of materials, one layer of which is reflective.

9. A solar energy collection system according to claim 2, wherein said tracking cables attach to the arches of at least one solar energy collection system across a field and wherein the tracking cables are attached to tracking pipes at the sides of the field and are wrapped around the tracking pipes, which tracking pipes draw in and let out the tracking cables as the tracking pipes rotate, and wherein the control system causes rotation of the tracking pipes to cause the solar energy collection systems to point toward the sun as the sun crosses the sky, and wherein, when a tracking pipe on one side of the field is retracting cables, the tracking pipe on the other side of the field is letting out cables.

10. A solar energy collection system according to claim 6 wherein the transparent tube is evacuated.

11. A solar energy collection system comprising:
a set of rigid ribs spaced apart along the length of the solar energy collection system, each of which rigid ribs has a parabolic curvature on its an inner surface;
a set of connection assemblies to which the rigid ribs are connected;
a set of support posts anchored to the ground or other foundation, which support posts are rotatably connected to said connection assemblies to support the connection assemblies and the rigid ribs;
a reflective film supported on the inner surface of the rigid ribs, the film having a curvature approximating the curvature of the inner surface of the rigid ribs to thereby define a trough having a parabolic cross section, for reflecting sun rays to a focal line;
a sun-tracking and rigidizing system connected to each of the rigid ribs for the purpose of rotating the solar energy collection system toward the sun and for making the solar energy collection system rotationally rigid, the sun-tracking and rigidizing system comprising a rigid framework operatively connected to each of the rigid ribs, and a connecting rod is connected to the rigid framework;
a set of tracking cables attached to the sun-tracking and rigidizing system for rotating the sun-tracking and rigidizing system wherein at least one tracking cable is attached to the end of each connecting rod;
a control system for retracting and letting out the tracking cables for pointing the solar energy collection system toward the sun; and
a fluid pipe, at the focal line of the reflected sunlight from the reflective film, for carrying a flowing fluid to absorb the heat of the solar energy;
wherein the control system moves the tracking cables in unison, and the tracking cables cause the rotation of the solar energy collection system as the tracking cables are moved, to rotate the solar energy collection system toward the sun so that the sunlight striking the reflective film is reflected to the fluid pipe, which heats the flowing fluid within the fluid pipe, which heated fluid provides heat for useful purposes, and wherein the tracking cables and the sun-tracking and rigidizing system provide rigidity to the solar energy collection system when the tracking cables are moved in unison by the control system.

12. A solar energy collection system according to claim 11, wherein said tracking cables are operatively connected to the connecting rods of at least one solar energy collection system across a field and wherein the tracking cables are attached at sides of the field to tracking pipes and are wrapped around the tracking pipes, which tracking pipes draw in and let out the tracking cables as the tracking pipes rotate, and wherein the control system causes rotation of the tracking pipes to cause the solar energy collection systems to point toward the sun as the sun crosses the sky, and wherein, when a tracking pipe on one side of the field is retracting cables, the tracking pipe on the other side of the field is letting out cables.

13. A solar energy collection system comprising:
a set of rigid ribs spaced apart along the length of the solar energy collection system, each of which rigid ribs has a parabolic curvature on its an inner surface; and
a set of connection assemblies to which the rigid ribs are connected; and
a set of support posts anchored to the ground or other foundation, which support posts are rotatably connected to said connection assemblies to support the connection assemblies and the rigid ribs; and a reflective film supported on the inner surface of the rigid ribs, the film having a curvature approximating the curvature of the inner surface of the rigid ribs to thereby define a trough having a parabolic cross section, for reflecting sun rays to a focal line, wherein the reflective film is stretched in the longitudinal direction so that the curvature of the film perpendicular to its length approximates the curvature of the inner surface of the rigid ribs; and a sun-tracking and rigidizing system connected to each of the rigid ribs for the purpose of rotating the solar energy collection system toward the sun and for making the solar energy collection system rotationally rigid; and a set of tracking cables attached to the sun-tracking and rigidizing system for rotating the sun-tracking and rigidizing system; and a control system for retracting and letting out the tracking cables for pointing the solar energy collection system toward the sun; and a fluid pipe, at the focal line of the reflected sunlight from the reflective film, for carrying a flowing fluid to absorb the heat of the solar energy;

wherein the control system moves the tracking cables in unison to rotate the solar energy collection system toward the sun so that the sunlight striking the reflective film is reflected to the fluid pipe, which heats the flowing fluid within the fluid pipe, which heated fluid provides heat for useful purposes, and wherein the tracking cables and the sun-tracking and rigidizing system make the solar energy collection system rotationally rigid; and wherein ends of the solar energy collection system comprise frameworks for supporting tension of the reflective films, and wherein end cables support the frameworks, which end cables are attached to support structures at a point that is in line with the center of the fluid pipe.

* * * * *